United States Patent
Kanai

(10) Patent No.: US 10,136,026 B2
(45) Date of Patent: Nov. 20, 2018

(54) IMAGE FORMING APPARATUS, METHOD, AND STORAGE MEDIUM STORING A PROGRAM

(71) Applicant: CANON KABUSHIKI KAISHA, Tokyo (JP)

(72) Inventor: Yasunori Kanai, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/428,615

(22) Filed: Feb. 9, 2017

(65) Prior Publication Data

US 2017/0237876 A1    Aug. 17, 2017

(30) Foreign Application Priority Data

Feb. 17, 2016    (JP) .................................. 2016-028299

(51) Int. Cl.
| | | |
|---|---|---|
| *G06K 15/02* | (2006.01) | |
| *G06F 3/12* | (2006.01) | |
| *H04N 1/04* | (2006.01) | |
| *H04N 1/393* | (2006.01) | |

(52) U.S. Cl.
CPC ......... *H04N 1/393* (2013.01); *G06K 15/1813* (2013.01); *G06K 15/1836* (2013.01); *H04N 1/04* (2013.01); *H04N 2201/0094* (2013.01)

(58) Field of Classification Search
None
See application file for complete search history.

(56) References Cited

U.S. PATENT DOCUMENTS

| | | | | | |
|---|---|---|---|---|---|
| 5,684,510 | A | * | 11/1997 | Brassell ................ | G06T 11/203 345/443 |
| 2004/0197028 | A1 | * | 10/2004 | Lin ........................ | G06T 11/203 382/279 |
| 2011/0299105 | A1 | * | 12/2011 | Morrison ................ | G06T 11/40 358/1.9 |
| 2012/0050761 | A1 | * | 3/2012 | Tsunekawa ........... | G06T 11/203 358/1.9 |
| 2014/0168665 | A1 | * | 6/2014 | Kaneda ............... | G03G 15/5025 358/1.1 |
| 2014/0168710 | A1 | * | 6/2014 | Ikari ...................... | H04N 1/405 358/2.1 |
| 2015/0036162 | A1 | * | 2/2015 | Belbin ............... | G06K 15/1828 358/1.13 |
| 2016/0012322 | A1 | * | 1/2016 | Iwata ................. | G06K 15/1874 358/1.2 |
| 2016/0044208 | A1 | * | 2/2016 | Oka .......................... | G06T 7/73 358/3.27 |
| 2017/0339308 | A1 | * | 11/2017 | Fujita ................. | H04N 1/40068 |

FOREIGN PATENT DOCUMENTS

JP        H04-139589 A        5/1992

* cited by examiner

*Primary Examiner* — Beniyam Menberu
(74) *Attorney, Agent, or Firm* — Fitzpatrick, Cella, Harper & Scinto

(57) ABSTRACT

A first conversion into pixels of an obtained object, for which the processing for widening the width of the object is performed, is performed, and a second conversion into pixels of the object, for which the processing for widening the width of the object is not performed, is performed. When the first conversion is performed, a pixel is filled or is not filled with color depending on a position of a boundary of the object in the pixel. When the second conversion is performed, a pixel is filled with color if the position of the boundary of the object exists in the pixel.

13 Claims, 10 Drawing Sheets

IMAGE FORMING APPARATUS, METHOD, AND STORAGE MEDIUM STORING A PROGRAM

BACKGROUND OF THE INVENTION

Field of the Invention

The present invention relates to an image forming apparatus, a method, and a storage medium storing a program for performing image formation processing.

Description of the Related Art

In image forming apparatuses, there are cases in which images are generated by switching a rendering method based on attribute information included in an inputted rendering command. Here, attribute information is information indicating a type of a rendering command, such as graphic, image, or text, for example.

Elements of a rendering object such as graphics, images, and text are rendered by processing called a scan conversion, and outputted to a raster output device. In a scan conversion, color values and positions of pixels, which are the smallest unit of an output device, are calculated from data in which elements of a rendering object are mathematically described, and an output image that is appropriate for the resolution of the output device is rendered.

There are cases in which various rendering methods are used when determining a color value of a pixel in accordance with a rendering command in the scan conversion. For rendering methods there are an intersect method, a top-left method, a center method and the like. In the intersect method, pixels that intersect even slightly with a rendering region of an object are filled in. In the top-left method, only pixels for which the top-left end point of the pixel are within an object rendering region are filled in. In the center method, only pixels for which the center of the pixel is within an object rendering region are filled in. Also, using rendering methods that differ depending on attribute information of a rendering object is well known. For example, the intersect method is used in rendering of an object having a graphic attribute, and the center method is used in rendering of an object having an image attribute.

Meanwhile, a technique of amending a thin line object and outputting in order to improve thin line reproducibility when rendering a thin line rendering object (thin line object) whose width is narrow. In Japanese Patent Laid-Open No. H4-139589 is recited a technique that improves thin line reproducibility by, if the width is 1 dot or less, executing anti-aliasing processing at a different gradation than usual. By improving thin line reproducibility in this way, it is possible to improve a print characteristic of an image forming apparatus. For example, by performing correction that widens a width of a thin line object, a thin line being outputted thinly is prevented.

A scan conversion of an object of the graphic attribute is executed by the intersect method in which pixels that intersect the object rendering region even slightly are filled in. In such a case, there are times when a width ends up being too wide depending on the position of the rendering object.

SUMMARY OF THE INVENTION

The present invention provides an image forming apparatus, a method and a storage medium storing a program for appropriately executing processing which is performed in relation to an object that satisfies a predetermined condition.

The present invention in one aspect provides an image forming apparatus that performs a scan conversion of an object, comprising: an obtainment unit configured to obtain an object; a correction unit configured to perform processing of widening a width of the object obtained by the obtainment unit; and a rendering unit configured to perform a first conversion into pixels of the object for which the processing for widening the width of the object is performed by the correction unit and to perform a second conversion into pixels of the object for which the processing for widening the width of the object is not performed by the correction unit, wherein, in a case when the rendering unit performs the first conversion, the rendering unit fills or does not fill a pixel with color depending on a position of a boundary of the object in the pixel, and in a case when the rendering unit performs the second conversion, the rendering unit fills a pixel with color if the position of the boundary of the object exists in the pixel.

By virtue of the present invention, it is possible to appropriately execute processing performed in relation to an object that satisfies a predetermined condition.

Further features of the present invention will become apparent from the following description of exemplary embodiments with reference to the attached drawings.

DESCRIPTION OF THE EMBODIMENTS

Figure 1:
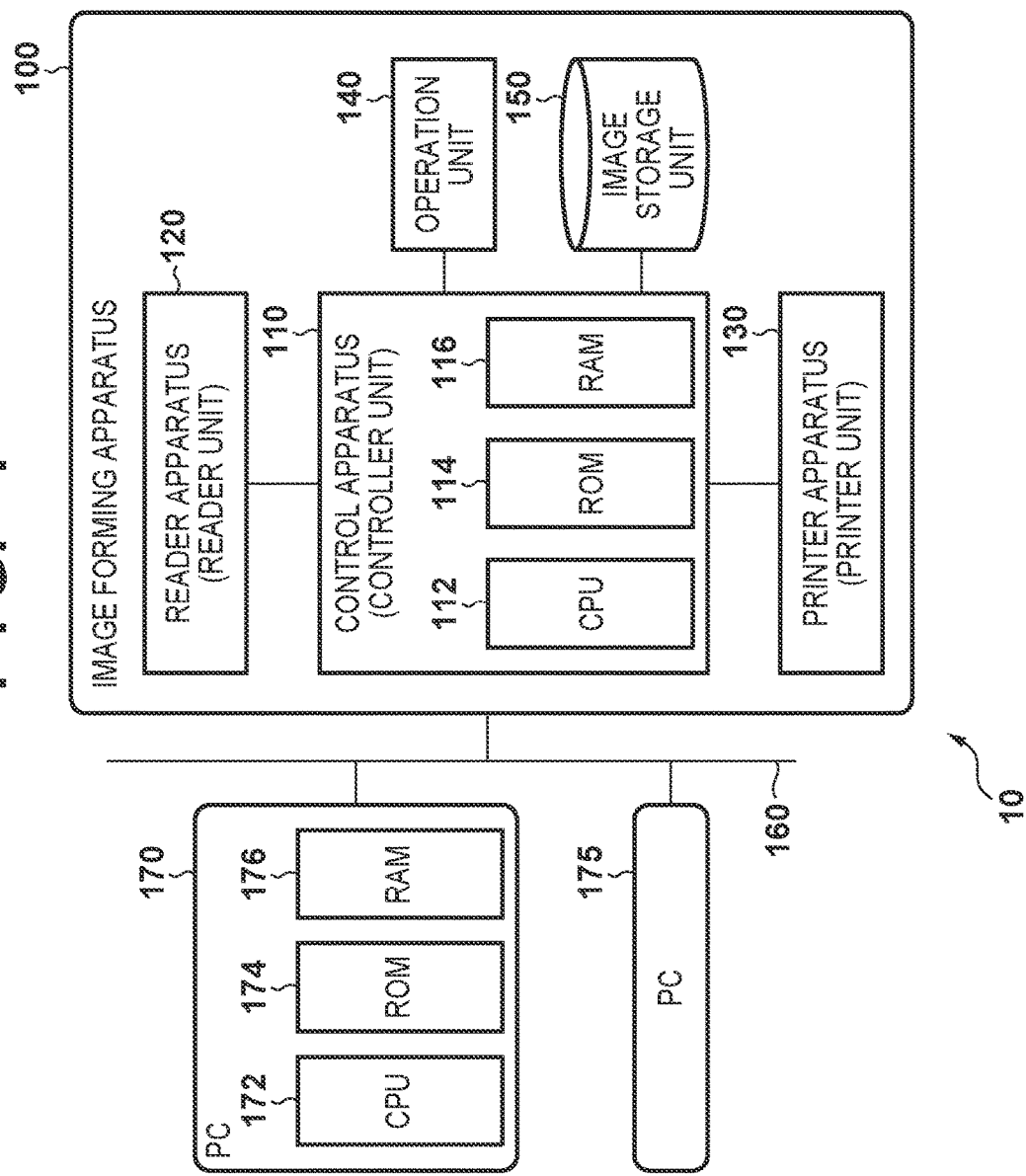
FIG. 1 is a view that illustrates a configuration of an image forming system.

Embodiments of the present invention will be described hereinafter in detail, with reference to the accompanying drawings. Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals have been added to the same configuration elements, and description thereof is omitted.

First Embodiment

[Image Forming System Configuration]

FIG. 1 is a view illustrating a configuration of an image forming system in the present embodiment. As illustrated in FIG. 1, an image forming system 10 in the present embodiment includes an image forming apparatus 100 and information processing apparatuses 170 and 175. The image forming apparatus 100, the information processing apparatus 170, and the information processing apparatus 175 are connected so as to be able to communicate with each other via a LAN (Local Area Network) 160 such as Ethernet (registered trademark).

The image forming apparatus 100 is a so-called MFP (Multifunctional Peripheral) capable of executing a plurality of types of functions such as image formation processing such as scanning and printing, facsimile, and transmission functions. The image forming apparatus 100 includes a reader apparatus 120, a printer apparatus 130, an operation unit 140, an image storage unit 150, and a control apparatus (a controller unit) 110 for controlling these configuration elements. Also, the image forming apparatus 100 has a network interface controller (NIC) (not shown).

The control apparatus 110 has a CPU 112, a ROM 114, and a RAM 116, and the CPU 112 comprehensively controls the entirety of the image forming apparatus 100 by executing programs stored in the ROM 114, the RAM 116, or another storage region. For example, the CPU 112 loads a predetermined program and executes it to perform PDL (Page Description Language) interpretation processing, display list generation processing, rendering processing, or the like. As another embodiment, for example, configuration may be taken so that rendering processing is executed by dedicated hardware other than the CPU 112.

The reader apparatus 120 is a reading apparatus for optically reading an original placed on an original platen (not shown), or an original that is supplied from an auto document feeder (ADF: Auto Document Feeder). The reader apparatus 120 comprises an image sensor unit that includes a light source that irradiates the original, and an image sensor that receives reflected light from the original and outputs a read signal, for example.

The printer apparatus 130 is a storage apparatus that performs image data image output processing (print processing). The printer apparatus 130 performs recording to a recording medium such as a print sheet by various recording methods such as an ink-jet printing method or an electrophotographic method. The operation unit 140 includes a keyboard that receives instruction operations and various print settings for performing image output processing and a liquid crystal panel (a display unit) that performs display of operation buttons for performing image output settings. The image storage unit 150 is an HDD, and stores print data (PDL data) described in PDL. For example, the control apparatus 110, when it receives PDL data that was sent from the information processing apparatus 170 which is a PC or the like via the LAN 160 at an NIC (not shown), stores the PDL data in the image storage unit 150. Here, the image storage unit 150 functions as a reception buffer. Note that receiving PDL data is called print job reception. In the present embodiment, an SFP (Single Function Printer), an LBP (Laser Beam Printer), or an apparatus capable of executing another recording method may be used as the image forming apparatus 100 rather than an MFP.

The information processing apparatuses 170 and 175 have a configuration of a general-purpose PC, for example. As illustrated in FIG. 1, the information processing apparatuses 170 and 175 include a CPU 172, which comprehensively control the respective apparatuses, a ROM 174, and a RAM 176. The image forming apparatus 100 and the information processing apparatuses 170 and 175 appropriately comprise blocks according to the functions that the respective apparatus can execute and not just the block configurations illustrated in FIG. 1. The information processing apparatuses 170 and 175 convert generated document data into PDL data by execution of a printer driver program (not shown) by the CPU 172, and send the result to the image forming apparatus 100.

[Configuration of Software Modules that Operate in Image Forming Apparatus 100]

Figure 2:
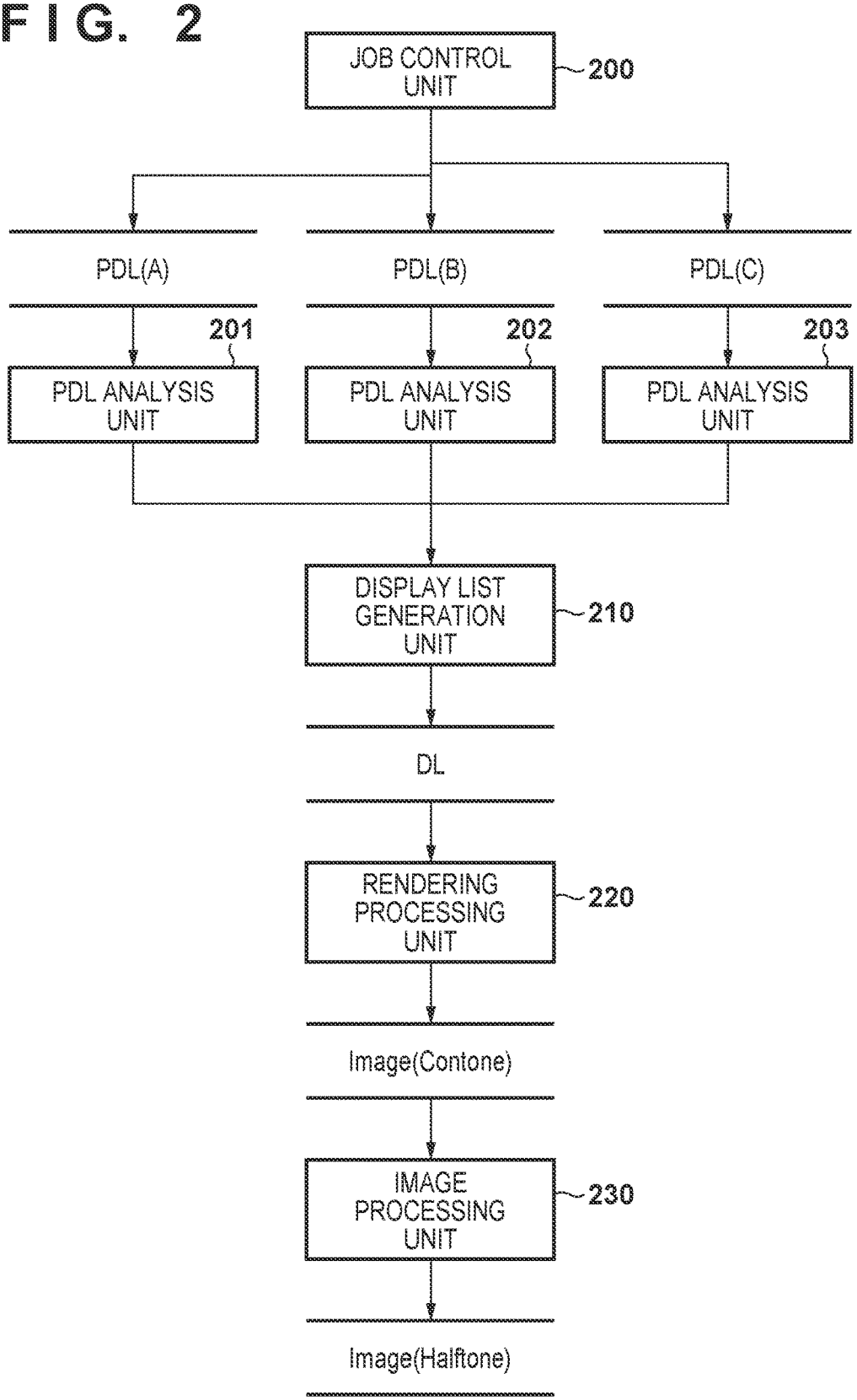
FIG. 2 is a view that illustrates a software module configuration of a control apparatus.

FIG. 2 is a view for illustrating a configuration of software modules operating in the control apparatus 110 of the image forming apparatus 100 in the present embodiment. Software illustrated in FIG. 2 is stored in the ROM 114 in the image forming apparatus 100, loaded into the RAM 116 at the time of activation, and operates by being executed by the CPU 112.

A job control unit 200 controls, by a function call, a message communication, or the like, from input of a print job until image output. PDL analysis units 201, 202, and 203 are configured to correspond to a type of PDL installed in the image forming apparatus 100. For example, in the present embodiment, PDL analysis units 201, 202, and 203 which respectively correspond to 3 types of PDL (LIPS (registered trademark), Postscript (registered trademark), and PCL (registered trademark)) are configured. PDL (A) of FIG. 2 corresponds to LIPS, PDL (B) to Postscript, and PDL (C) to PCL. The PDL analysis units 201, 202, and 203, by control from the job control unit 200, read and obtain PDL data stored in a PDL reception buffer (not shown), and execute PDL interpretation processing thereon. After the interpretation processing, the PDL analysis units 201, 202, and 203 respectively output rendering commands (rendering information) to a display list generation unit 210.

The display list generation unit 210, under control from the job control unit 200, generates a display list according to rendering commands outputted from the PDL analysis units 201, 202, and 203, and stores the generated display list in the RAM 116. A rendering processing unit 220 loads the display list from the RAM 116, converts the display list into image data by executing rendering processing, and outputs that to the image storage unit 150. In the present embodiment, operation up until the display list is generated by the display list generation unit 210, and rendering into pixels is performed by the rendering processing unit 220 is referred to as rendering.

An image processing unit 230 loads rendering bitmap images and attribute bitmap images from the image storage unit 150, and executes image processing by optimal image processing parameters according to attributes. The image processing unit 230 converts contone image data into halftone image data by image processing, and outputs the result to the image storage unit 150.

Note that the image forming apparatus 100 of the present embodiment processes received PDL data by software modules illustrated in FIG. 2, as described above, but other embodiments can be considered. For example, the image forming apparatus 100 may realize this by hardware circuits that perform the processing executed by the respective software modules instead of the software modules. Configuration may also be taken such that some of the software modules of FIG. 2 are realized by software modules and the rest are realized by hardware circuits. For example, configuration may also be taken such that the PDL analysis units 201, 202, and 203 and the display list generation unit 210 are realized by software modules, and the rendering processing unit 220 and the image processing unit 230 are realized by hardware circuits.

[Configuration of Widening Processing Software Module]

Figure 4:
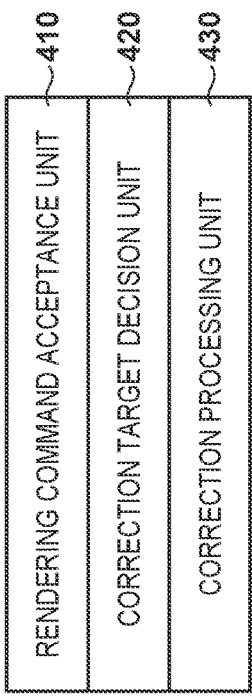
FIG. 4 is a view illustrating a software module configuration for rendering correction processing.

FIG. 4 is a view for illustrating a configuration of a rendering correction processing software module included in the display list generation unit 210 in the present embodiment. Here, the widening (thickening) processing performed as one rendering correction process is processing of "making a thin line that is less than N prior to the scan conversion be N", for example processing that widens a thin line whose width is less than two pixels to two pixels assuming that N=2. Note that, a rendering correction process module of the display list generation unit 210 performs widening processing on a rendering object if a setting to widen the width of the rendering object is performed, and does not perform widening processing if the setting is not performed, as is described later.

Figure 3A:
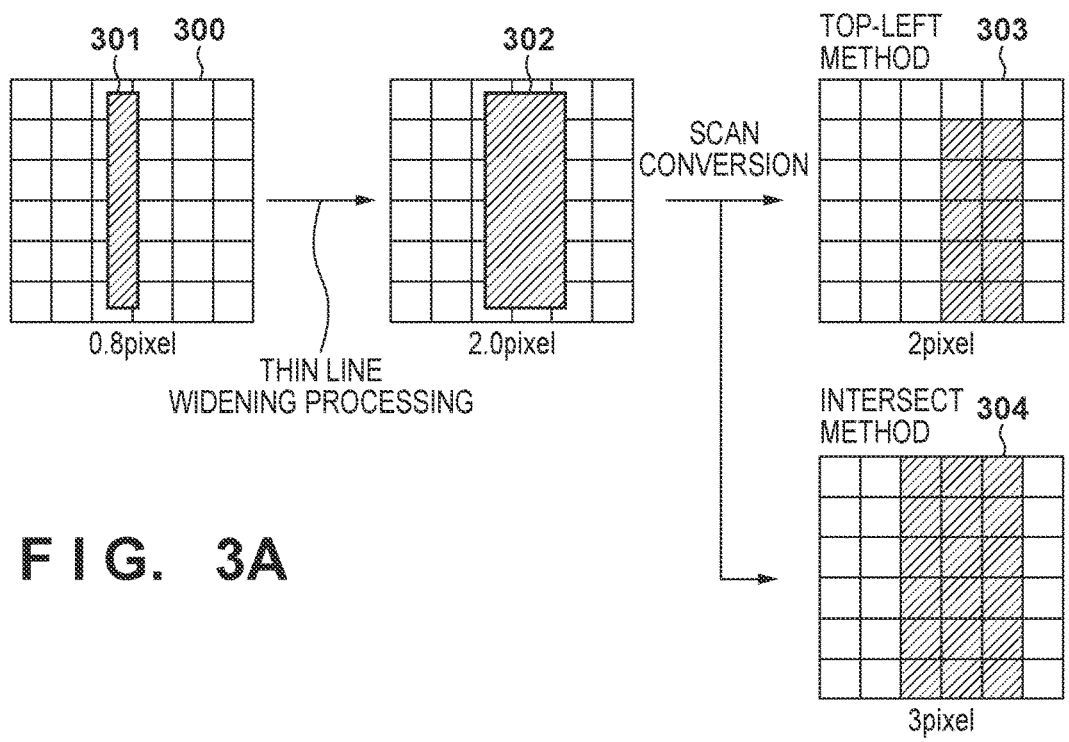
FIG. 3A and FIG. 3B are views for describing a scan conversion.

As illustrated in FIG. 3A, there is a 0.8 pixel rendering target object (rendering object) 301 on pixel coordinates 300. A rendering object 302 illustrates the result of widening the rendering object width to two pixels by widening processing. The result of performing a scan conversion by the top-left method on the rendering object 302 is illustrated at pixel coordinates 303. Also, coordinates at which a color is filled in are of a width of two pixels as illustrated in the figure. Meanwhile, color is given to pixels that intersect the rendering object 302 in the case where a scan conversion is performed by the intersect method on the rendering object 302. The result of this is that coordinates at which a color is filled in are of a width of three pixels as illustrated at pixel coordinates 304. Here, even though it is expected that the result of the widening processing will be a two pixel width, the actual rendering result is widened by one too many pixels.

Figure 3B:
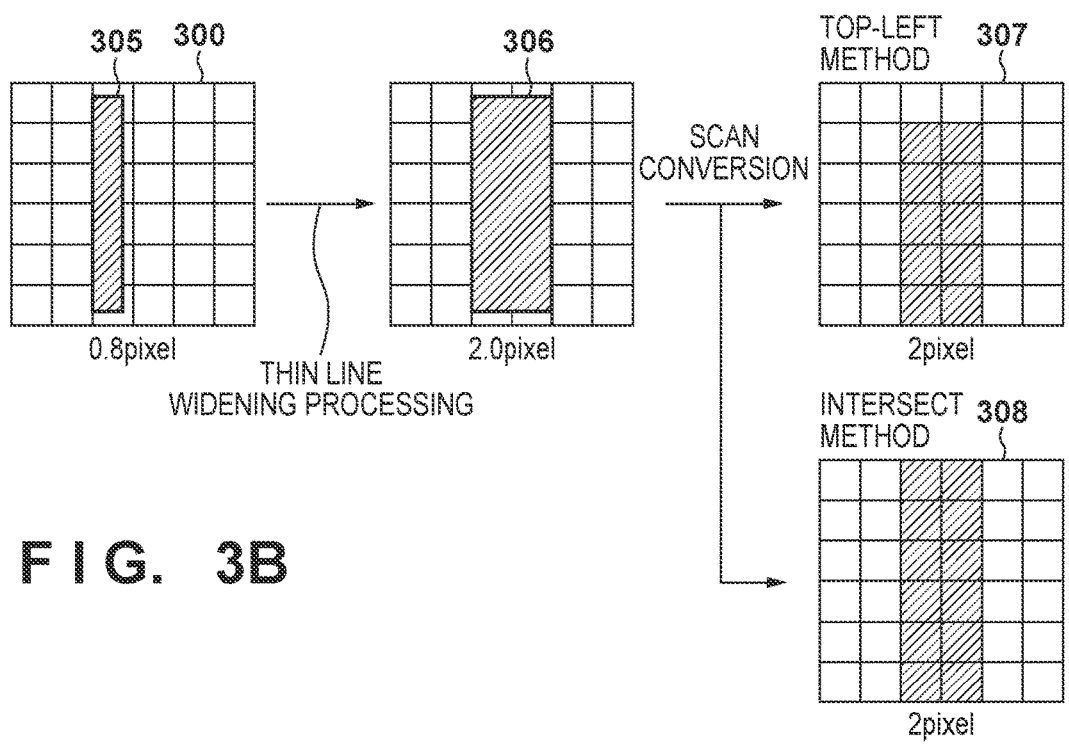

FIG. 3B illustrates a case in which a position (left side) of a rendering object aligns with a boundary of a coordinate. The left side position of a rendering object 305 which is 0.8 pixels on the pixel coordinates 300 is aligned with the boundary of pixels. Here, if the width is widened to two pixels by performing the widening processing, the right side of a rendering object 306 is also aligned with the boundary of a coordinate. The result after the scan conversion is that irrespective of whether the rendering method is the top-left method or the intersect method, the width becomes two pixels as illustrated in the pixel coordinates 307 and 308.

As in FIG. 3A and FIG. 3B, there are cases in which the width of a rendering object becomes wider than envisioned due to a scan conversion depending on the rendering method or the rendering position at which the widening processing is executed.

A rendering command acceptance unit 410 accepts rendering commands that are outputted from the PDL analysis units 201, 202, and 203. This corresponds to the rendering command acceptance unit 410 obtaining a rendering object. A correction target decision unit 420 decides the rendering command of the correction target from a rendering command that the rendering command acceptance unit 410 accepted. In the present embodiment, for example, a rendering command for a thin line object, which is a graphic attribute and whose width is less than N pixels (N is arbitrary) is made to be a correction target. This corresponds to the correction target decision unit 420 determining whether the rendering object satisfies a predetermined condition. A correction processing unit 430 performs correction processing on the rendering command that the correction target decision unit 420 decided to be the correction target. That is, the correction processing unit 430 performs correction processing to widen the width, which is less than the threshold N, to N. This correction processing is processing for changing (correcting) information of a rendering position and shape 703, which is included in a rendering command 700, which is described later using FIG. 7, and is referred to as widening processing. Also, this corresponds to the correction processing unit 430 performing the widening processing on a rendering object that satisfies the predetermined condition.

Figure 5:
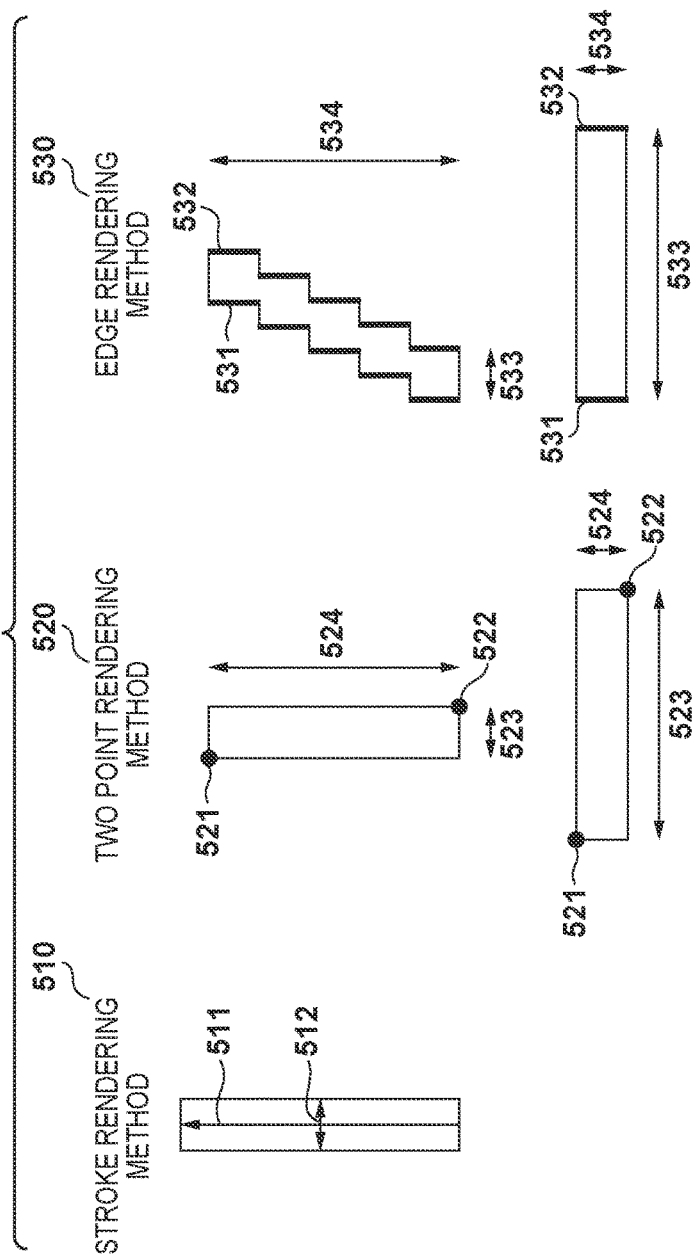
FIG. 5 is a view for describing a width determination method.

Here, a method for determining whether or not the width is less than the threshold N pixels, which is performed by the correction target decision unit 420, is described with reference to FIG. 5.

As methods for rendering a line in the case of the graphic attribute, there are, for example, a stroke rendering method 510, a two point rendering method 520, and an edge rendering method 530. The stroke rendering method 510 is a method of rendering a line using a path 511 and a width 512. The path 511 is represented by coordinates of a start point and an end point included in the rendering position and shape 703 if a render type 701 of the rendering command 700 is the stroke rendering method. Also, the width 512 is represented by a value in units of pixels included in the rendering position and shape 703 if the render type 701 of the rendering command 700 is the stroke rendering method. A method for determining a thin line in the stroke rendering method 510 is to determine a thin line object if the value of the width 512 of a rendering object is less than a threshold (less than N pixels), and to determine that it is not a thin line object if it is greater than or equal to the threshold (greater than or equal to N pixels).

The two point rendering method 520 is a line rendering method that uses an initiation point (a top-left point) 521 and a termination point (a bottom-right point) 522. The initiation point 521 and the termination point 522 are represented by start point and end point coordinates included in the rendering position and shape 703 if the render type 701 of the rendering command 700 is the two point rendering method. The thin line determination method in the two point rendering method 520 is to determine a thin line object if a width 523 or a width 524 of the initiation point 521 and the termination point 522 is less than a threshold, and to determine that is it not a thin line object if they are greater than or equal to the threshold. The width 523 is an absolute value of a difference of the X coordinates of the points, and the width 524 is an absolute value of the difference of the Y coordinates of the points.

The edge rendering method 530 is a line rendering method using a set of a left side edge 531 and a right side edge 532. The left side edge 531 and the right side edge 532 are represented as a path indicating a shape of a left side edge included in the rendering position and shape 703 (a plurality of coordinates) and a path indicating a shape of the right side edge (a plurality of coordinates) if the render type 701 of the rendering command 700 is the edge rendering method. The thin line determination method in the edge rendering method 530 is to determine a thin line object if a width 533 between the edges or a height 534 of the edge set is less than a threshold, and to determine that is it not a thin line object if these are greater than or equal to the threshold. The width 533 between the edges is the absolute value of the difference between the X coordinates of the left side edge and the right side edge in each Y coordinate, and the height 534 of the edge set is the minimum value of the height of the left side edge and the right side edge.

Figure 11:
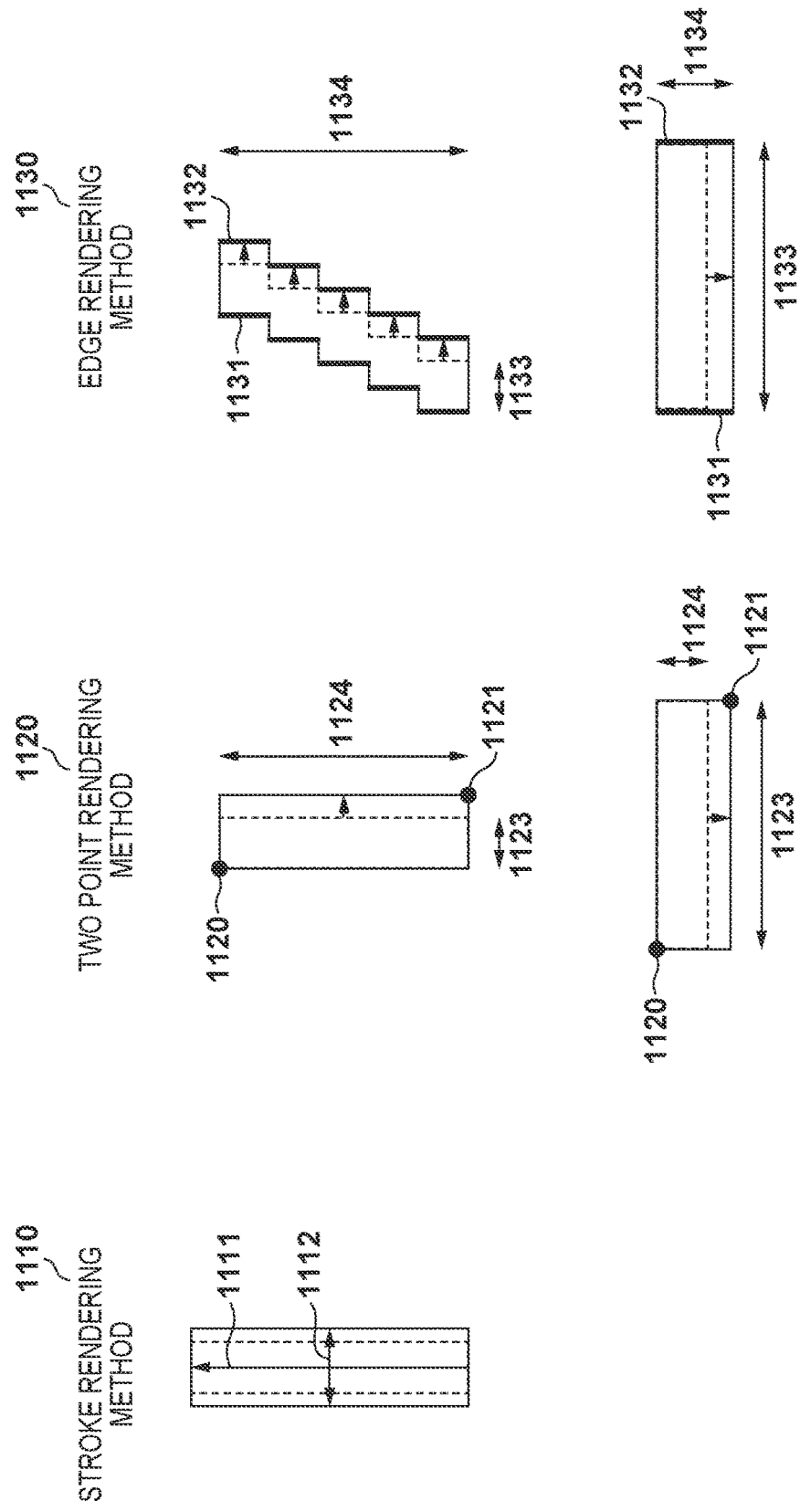
FIG. 11 is a view for describing width correction processing.

Next, a method of widening a width, which is performed in processing (step S615) of the later described flowchart of FIG. 6, will be described. Widening processing regarding each line rendering method of FIG. 5 is illustrated in FIG. 11. A thin line widening method is different depending on the respective method of rendering the thin line. In a case of a stroke rendering method 1110, a width 1112 is corrected to pixels of a threshold N in a case when the width 1112 included in the rendering position and shape 703 is less than the threshold. In a case of a two point rendering method 1120, a termination point 1121 included in the rendering position and shape 703 is moved to the right side such that a width 1123 is the pixels of the threshold N in a case when the width 1123 is less than the threshold. Alternatively, the termination point 1121 included in the rendering position and shape 703 is moved to the bottom side such that a height is N pixels in a case when a height 1124 is less than the threshold. In a case of an edge rendering method 1130, a position of the right side edge included in the rendering position and shape 703 is moved such that a width between edges becomes a width N in a case when a width 1131 between edges is less than the threshold. Alternatively, a height of a left side edge 1131 and a right side edge 1132 included in the rendering position and shape 703 is extended such that the height of the edge set becomes a height N in a case when a height 1134 of the edge set is less than the threshold.

Although in all of the cases above, correction is performed such that a value of a size corresponding to less than the threshold is made to be the threshold, configuration may be taken to correct to a value greater than or equal to the threshold in accordance with a setting of the reproducibility of a thin line.

[Rendering Method of the Image Forming Apparatus 100]

Figure 7:
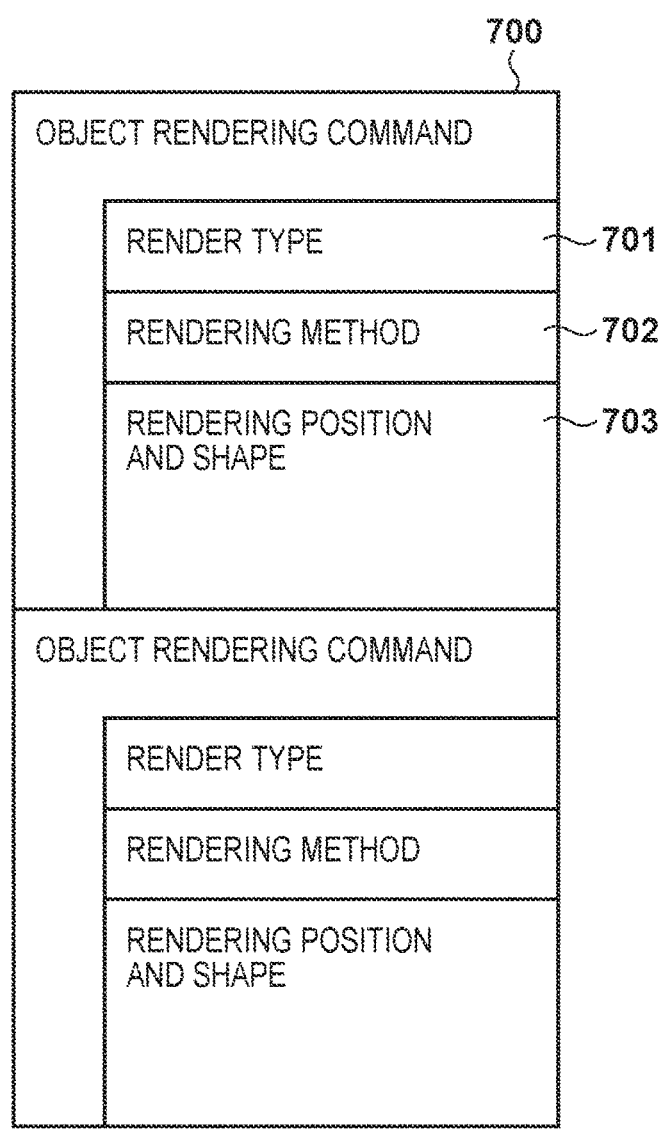
FIG. 7 is a view for describing a rendering command.
Figure 8:
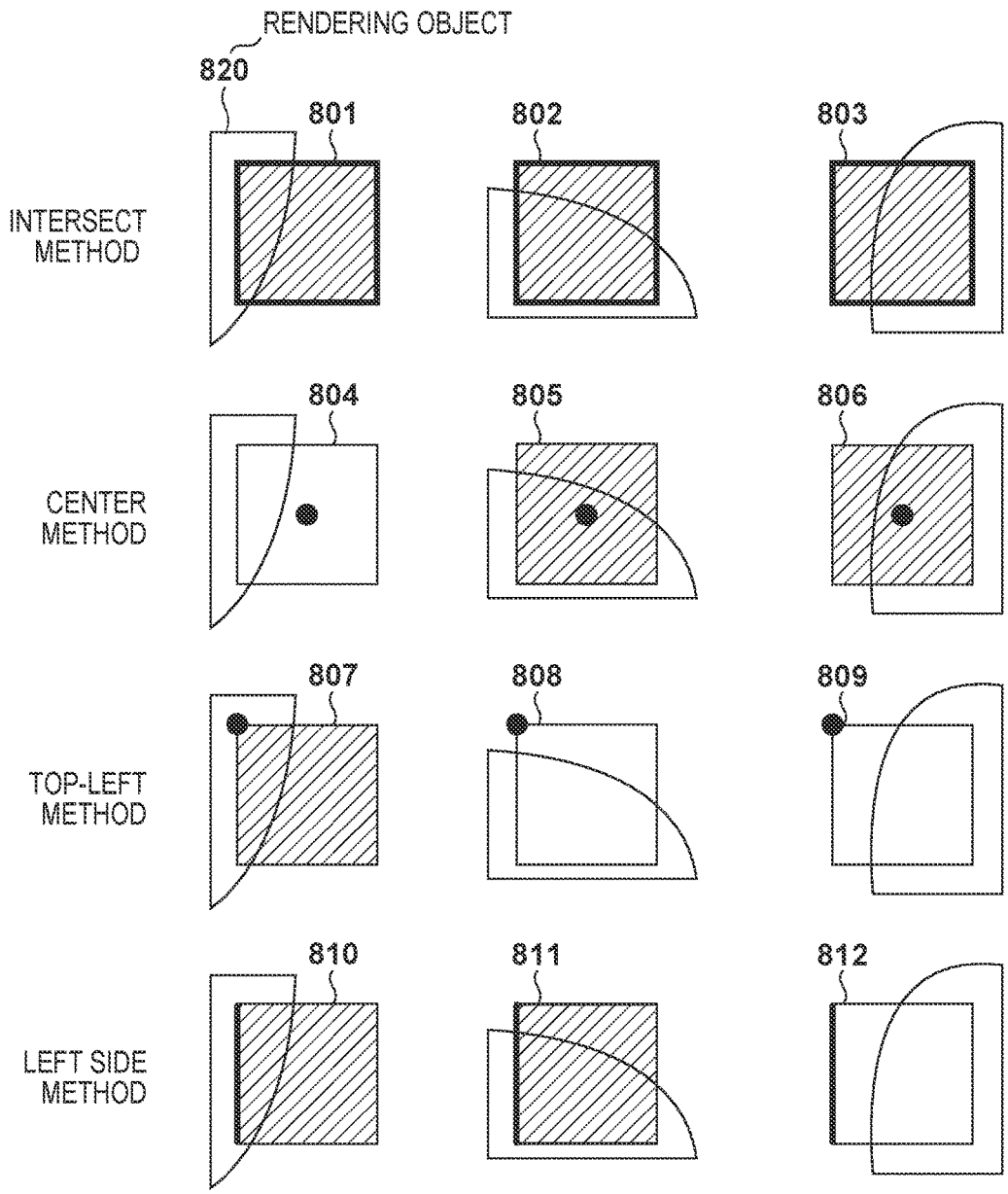
FIG. 8 is a view for describing scan conversions.

FIG. 8 is a view for describing differences depending on the rendering method when performing a scan conversion of a rendering object in the rendering processing unit 220 of the image forming apparatus 100 in the present embodiment. As described above, the scan conversion is a process for converting a rendering object to pixels of pixel coordinates. For this reason, a rendering object which has a decimal pixel width (0.8 pixel width, for example) is converted by the scan conversion to a rendering object image which has an integer pixel width (1 pixel width, for example). Although there are the intersect method, the center method, the top-left method, the left side method, and the like illustrated in FIG. 8, for example, other methods may also be used as the rendering method in the present embodiment. Note, these rendering methods are designated in a display list generated by the display list generation unit 210 as described later using FIG. 7. Also, the rendering processing unit 220 generates a rendering object image by performing a scan conversion of a rendering object in accordance with the designated rendering method.

The size of pixels 801 through 812 illustrated in FIG. 8 depends on a print resolution of the image forming apparatus 100. Normally, the size of a pixel is 1/600=0.00167 inches in a case when the print resolution of the image forming apparatus 100 is 600 dpi. Also, the size of a pixel is 1/1200=0.00083 inches in a case when the print resolution of the image forming apparatus 100 is 1200 dpi. Here, a rendering object 820 represents a rendering object generated by the display list generation unit 210 and partially overlaps the pixels 801 through 812 as illustrated in FIG. 8.

In the intersect method, regarding the rendering object 820, pixels that intersect even slightly with a rendering region of the rendering object 820 are made to be the fill targets and then filling is performed. In other words, regarding the rendering object 820, the pixels 801, 802, and 803 are made to be targets of filling by a color of the rendering object 820. Specifically, a scan conversion in accordance with the intersect method converts the width of the rendering object prior to the scan conversion to an integer pixel width larger than the former width. Whether an integer pixel width becomes a value that rounds up the width of the rendering object or becomes a value that adds 1 to the rounded up value depends on the rendering position of the rendering object.

In the center method, regarding the rendering object 820, only pixels for which the center of the pixel is within a region of the rendering object 820 are made to be fill targets and then filling is performed. In other words, regarding the rendering object 820, the pixels 805 and 806 are made to be targets of filling by a color of the rendering object 820 and the pixel 804 is not made to be a fill target.

In the top-left method, regarding the rendering object 820, only pixels for which the top-left end point of the pixel is within a region of the rendering object 820 are made to be fill targets and then filling is performed. In other words, regarding the rendering object 820, the pixel 807 is made to be a target of filling by a color of the rendering object 820 and the pixels 808 and 809 are not made to be targets of filling by a color of the rendering object 820.

In the left side method, regarding the rendering object 820, pixels for which the left side of the pixel is contained in a region of the rendering object 820 and pixels for which the left side of the pixel intersects even slightly with a region of the rendering object 820 are made to be fill targets and the filling is performed. In other words, regarding the rendering object 820, the pixels 810 and 811 are made to be targets of filling by a color of the rendering object 820 and the pixel 812 are not made to be targets of filling by a color of the rendering object 820.

Specifically, the scan conversion in accordance with the center method, the top-left method, and the left side method converts the width of the rendering object prior to the scan conversion to a value for which the width is rounded up or to a value for which it is rounded down. Whether the value is rounded up or the value is rounded down is determined depending on the rendering position of the rendering object. Considering the above, there is more of a tendency for pixels to be filled with a color of the object with the intersect method compared to the other rendering methods.

Figure 6:
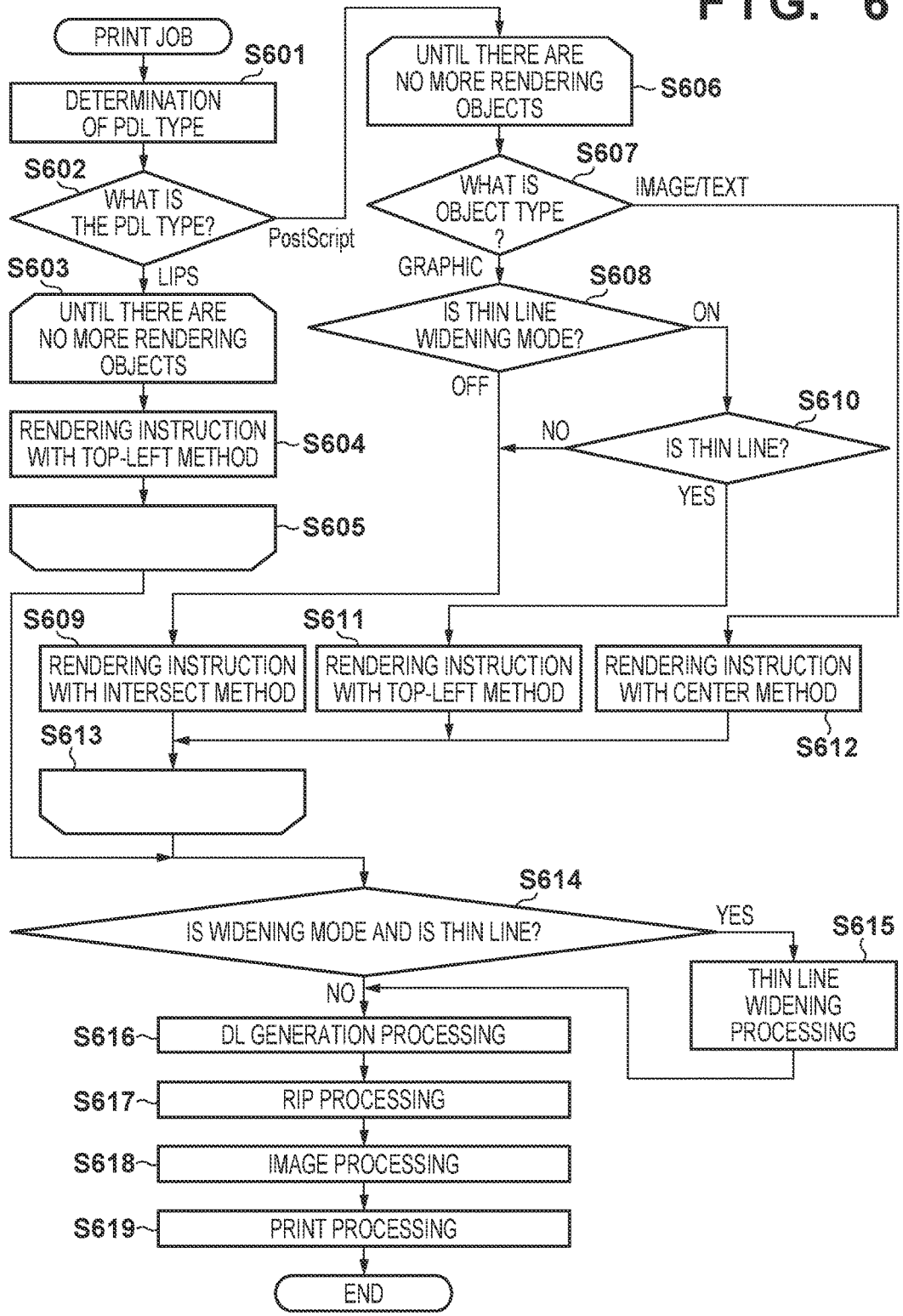
FIG. 6 is a flowchart illustrating control for executing thin line correction processing.

FIG. 6 is a flowchart illustrating control in which the image forming apparatus 100 receives a print job and executes thin line correction processing. The processes of FIG. 6 are realized by the CPU 112 reading a program stored in the ROM 114 into the RAM 116 and executing it for example.

In step S601, the CPU 112 performs a determination of the PDL type by the job control unit 200 when a print job is received. For example, the CPU 112 determines whether the PDL type is LIPS or Postscript.

In step S602, the CPU 112 advances to step S603 in a case when the PDL type is determined to be LIPS and advances to step S606 in a case when it is determined to be Postscript. Note, the processing of step S603 through step S605 is performed by the PDL analysis unit 201 for LIPS and the processing step S606 through step S613 is performed by the PDL analysis unit 202 for Postscript.

Below, the processing is described in a case when the PDL type is determined to be LIPS in step S602. In step S603 through step S605, the CPU 112, from the head to the end of the data, interprets the PDL data in units of rendering objects and outputs rendering commands of the interpreted rendering objects to the display list generation unit 210 by the PDL analysis unit 201 (rendering instruction). In such a case, the rendering command of a rendering object is output as the top-left method. This processing is repeatedly performed for every rendering object within the PDL data (step S603 through step S605). Note, step S603 and step S605 indicate loop ends of the processing of step S604 which is repeatedly performed for each rendering object.

FIG. 7 is a view illustrating one example of a rendering command outputted to the display list generation unit 210 by the PDL analysis units 201, 202, and 203. An object rendering command 700 includes the render type 701, a rendering method 702, and the rendering position and shape 703. For the render type 701, information of any of the stroke rendering method 510, the two point rendering method 520, and the edge rendering method 530 is stored. For the rendering method 702, information of a rendering method such as the intersect method, the center method, the top-left method, and the left side method is stored. For the rendering position and shape 703, position and shape information of the rendering object is stored. The rendering position and shape 703 differs from the render type 701 as described above. The object rendering command 700 which includes these pieces of information is outputted to the display list generation unit 210 for each generated rendering object. Then the display list generation unit 210 generates a display list including these inputted (obtained) pieces of information 701 through 703.

Below, the processing is described in a case when the PDL type is determined to be Postscript in step S602. Step S606 through step S613 are processes performed by the PDL analysis unit 202. The processing of step S606 through step S613 is repeatedly performed by the PDL analysis unit 202 for every rendering object within the PDL data. Note, step S606 and step S613 indicate loop ends of the processing of steps S607-step S612 which is repeatedly performed for each rendering object.

In step S606, the CPU 112 starts analysis of the PDL data by the PDL analysis unit 202. In step S607, the CPU 112 determines whether the type of rendering object is "graphic" or "image/text". Here, step S612 is advanced to in a case when it is determined to be "image/text", and the CPU 112 outputs a rendering command with the center method to the display list generation unit 210.

Meanwhile, step S608 is advanced to in a case when the type of the rendering object is determined to be "graphic" in step S607. In step S608, the CPU 112 determines whether or not the current operation mode of the image forming apparatus 100 is set as the thin line widening mode. In other words, here, the CPU 112 determines whether or not a setting for widening the width of the rendering object was made. This setting determination may be determined based on content of a setting made via the operation unit 140 by the user for example. Here, the thin line widening mode is processing for widening the width of a graphic object determined to be a thin line to a threshold and is performed by the display list generation unit 210 in order to cause reproducibility of the thin line to improve for example. A setting value of the thin line widening mode (a value representing a size of a rendering object, a width, a threshold, or the like) is stored in advance as a setting value of the image forming apparatus 100.

Step S609 is advanced to in a case when it is determined that it is not the thin line widening mode in step S608, and the CPU 112 outputs to the display list generation unit 210 a rendering command so as to render the rendering object by the intersect method. Meanwhile, step S610 is advanced to in a case when it is determined that it is the thin line widening mode in step S608, and the CPU 112 determines whether or not the target rendering object is a thin line as described in FIG. 5. Here, step S609 is advanced to in a case when it is determined that it is not a thin line (No in step S610), and the CPU 112 outputs to the display list generation unit 210 a rendering command so as to render the rendering object by the intersect method. Meanwhile, in a case when the target rendering object is determined to be a thin line (Yes in step S610), the CPU 112 outputs to the display list generation unit 210 a rendering command so as to render the rendering object by the top-left method.

In FIG. 6, in a case when it is determined that it is the thin line widening mode in step S608, the determination of step S610 is performed. However, configuration may also be taken such that the thin line widening mode is performed for a thin line if it has been determined that the type of the rendering object is a graphic rather than specifically determining the mode of the apparatus. In such a case, the determination of step S610 is performed when it is determined to be a graphic in step S607. Meanwhile, in a case when the target rendering object is determined to be a thin line in step S610, step S611 is advanced to and the CPU 112 outputs to the display list generation unit 210 a rendering command so as to render the rendering object by the top-left method.

The CPU 112 advances to step S614 when the processing by the PDL analysis units 201 through 203 ends. The processing of step S614 through step S616 is processing performed by the display list generation unit 210.

In step S614, the CPU 112 determines whether the thin line widening mode is ON and the rendering object is a thin line, by the display list generation unit 210. The method for determining whether the rendering object is a thin line is described using FIG. 5. Step S615 is advanced to in a case when it is determined that "the thin line widening mode is ON and the rendering object is a thin line" in step S614, and the CPU 112 performs processing for widening the thin line object as described using FIG. 11. In other words, the CPU 112 performs processing (widening processing) for widening the width of the rendering object. Meanwhile, step S616 is advanced to when it is determined that it is not the case that "the thin line widening mode is ON and the rendering object is a thin line" in step S614.

In step S616, the CPU 112 performs a generation of a display list by the display list generation unit 210 and advances to step S617. In step S617, the CPU 112 performs rendering processing for the generated display list and generates an image by the rendering processing unit 220. At that time, the scan conversion described in FIG. 8 and FIG. 3 is performed. In other words, the rendering processing unit 220 performs a scan conversion of a rendering object represented by the render type 701 and the rendering position and shape 703 included in the display list in accordance with the rendering method designated in the display list. As a result, an image of the rendering object is generated. In this way, by simply deciding the rendering method 702 and instructing the decided rendering method 702 in the display list at the time of generation of the display list, the rendering processing unit 220 can perform rendering processing by that instructed rendering method. Specifically, it is not necessary for the rendering processing unit 220 to perform processing for deciding and instructing the rendering method or the widening processing. After the scan conversion, step S618 is advanced to. In step S618, the CPU 112 performs image processing by the image processing unit 230 for the generated image. In step S619, the CPU 112 prints, by the printer apparatus 130, the image for which image processing was performed and after that, ends the processing of FIG. 6.

As described above, in the present embodiment, configuration is taken such that, in the PDL interpretation processing in which rendering of a graphic object is performed by the intersect method, such as with Postscript for example, rendering is performed by the top-left method in a case when the thin line widening mode is ON and a thin line is rendered. As a result, a thin line being widened too much as illustrated by the pixel 304 of FIG. 3 can be prevented.

Note, the rendering method of the rendering object is set as the intersect method or the top-left method in accordance with the result of the determination of step S608 and step S610 as described above. Meanwhile, in the flowchart of FIG. 6, the following variation in which the determination of step S610 is omitted may be taken. Specifically, when it is determined that the setting for widening the width of the rendering object was not made in step S608, the CPU 112 sets the intersect method as the method of rendering a rendering object of the graphic attribute in step S609. By setting in this way, the rendering object of the graphic attribute can be reliably rendered regardless of the rendering position even if the width is less than one pixel. Meanwhile, when it is determined that the setting for widening the width of the rendering object was made in step S608, the CPU 112 sets the top-left method as the method of rendering a rendering object of the graphic attribute in step S611. In this way, widening processing for the rendering object of the graphic attribute may be performed so that too much widening can be prevented.

Second Embodiment

Hereinafter, description will be given regarding a second embodiment. There exist cases in which a predetermined rendering setting is performed for a rendering object of a specific attribute, such as a rendering setting to a width "zero" for a thin line in Postscript, for example. In Postscript, rendering by the smallest rendering unit (a pixel width for example) of the device is recommended in a case when the rendering is set to width "zero". In other words, it is better for the widening processing to not be performed for a thin line for which a rendering setting to width "zero" is made.

Figure 9:
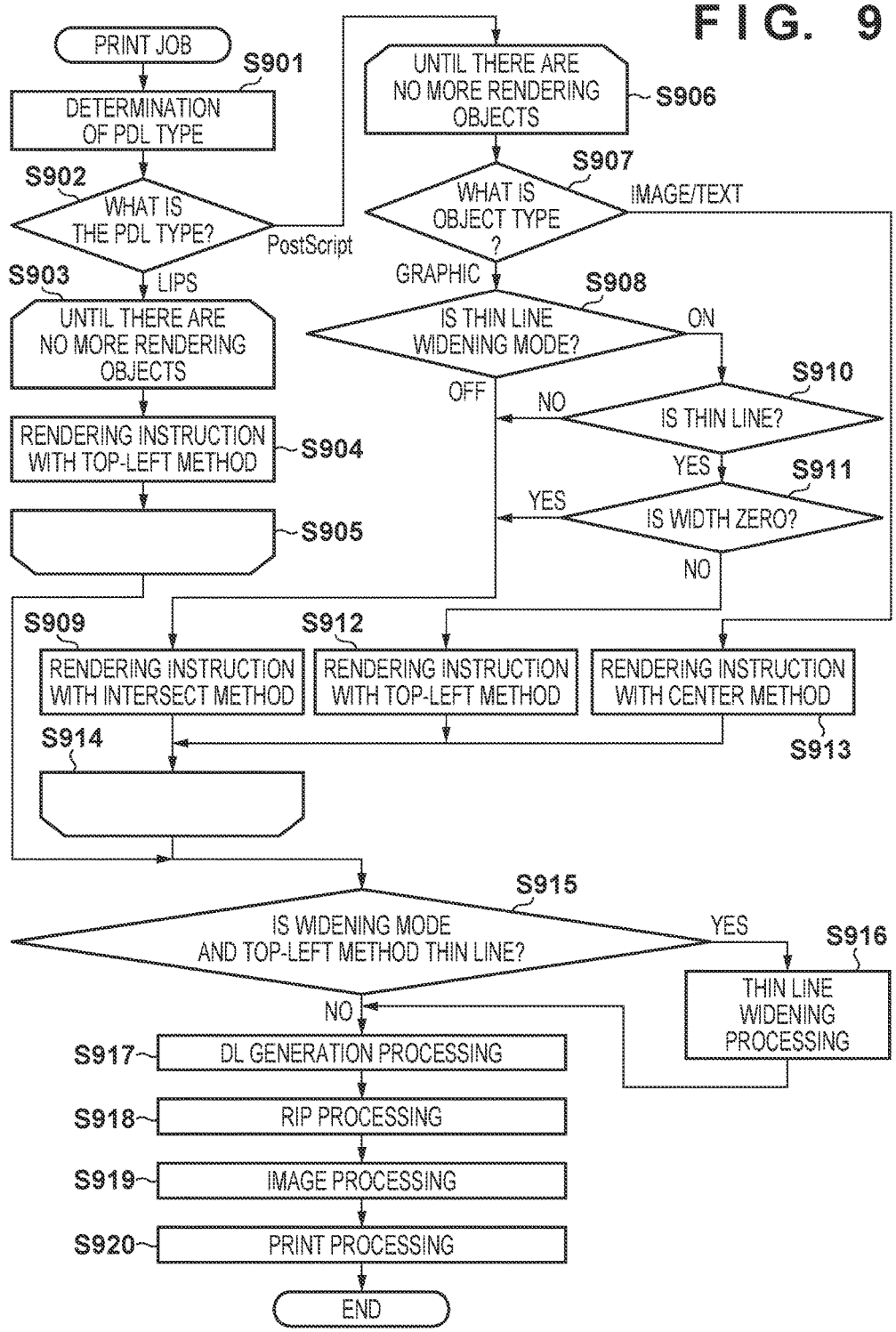
FIG. 9 is a flowchart illustrating control for executing thin line correction processing.

FIG. 9 is a flowchart illustrating control in which the image forming apparatus 100 receives a print job and executes thin line correction processing in the present embodiment. The processes of FIG. 9 are realized by the CPU 112 reading a program stored in the ROM 114 into the RAM 116 and executing it for example.

In step S901, the CPU 112 performs a determination of the PDL type by the job control unit 200 when a print job is received. For example, the CPU 112 determines whether the PDL type is LIPS or Postscript.

In step S902, the CPU 112 advances to step S903 in a case when the PDL type is determined to be LIPS and advances to step S906 in a case when it is determined to be Postscript. The processing of step S903 through step S905 for a case when LIPS is determined in step S902 is the same as step S603 through step S605 of the first embodiment, and therefore the description is omitted.

Hereinafter, description will be given for a case when it is determined that the PDL type is Postscript in step S902. The processing of step S906 through step S913 is repeatedly performed by the PDL analysis unit 202 for every rendering object within the PDL data.

In step S906, the CPU 112 starts analysis of the PDL data by the PDL analysis unit 202. In step S907, the CPU 112 determines whether the type of rendering object is "graphic" or "image/text". Here, step S913 is advanced to in a case when it is determined to be "image/text", and a rendering command with the center method is output to the display list generation unit 210. Meanwhile, step S908 is advanced to in a case when the type of the rendering object is determined to be "graphic" in step S907. In step S908, the CPU 112 determines whether or not the current operation mode of the image forming apparatus 100 is set as the thin line widening mode.

In a case when it is determined to not be the thin line widening mode in step S908, the CPU 112 outputs a rendering command with the intersect method to the display list generation unit 210. Meanwhile, step S910 is advanced to in a case when it is determined that it is the thin line widening mode in step S908, and the CPU 112 determines whether or not the target rendering object is a thin line. Here, step S909 is advanced to in a case when it is determined to not be a thin line, and the CPU 112 outputs a rendering command with the intersect method to the display list generation unit 210. Meanwhile, in a case when it is determined that the target rendering object is a thin line in step S910, step S911 is advanced to.

In step S911, the CPU 112 determines whether or not that thin line is a thin line for which the width is set to "zero". Here, step S909 is advanced to in a case when it is determined to be a thin line for which the width is set to "zero", and the CPU 112 outputs a rendering command with the intersect method to the display list generation unit 210. Meanwhile, in a case when it is determined that the thin line is not a thin line for which the width is set to "zero" in step S911, step S912 is advanced to, and the CPU 112 outputs a rendering command with the top-left method to the display list generation unit 210.

The CPU 112 advances to step S915 when the processing by the PDL analysis unit 202 ends. The processing of step S915 through step S920 is processing performed by the display list generation unit 210.

In step S915, the CPU 112 determines by the display list generation unit 210 whether, in the object rendering command 700 received from the PDL analysis unit 201 through 203, the thin line widening mode is ON and the top-left method rendering instruction is set.

Meanwhile, step S917 is advanced to when it is determined that it is not the case of "the thin line widening mode is ON and it is a top-left method thin line rendering instruction" in step S915. Meanwhile, when it is determined that "thin line widening mode is ON and it is a top-left method thin line rendering instruction" in step S915, step S916 is advanced to, and the CPU 112 performs the widening processing described in FIG. 11.

Thus in the present embodiment, in addition to the configuration in the first embodiment, the widening processing is not performed for a rendering object for which width is set to "zero". As the result, it is possible to prevent the widening processing being performed even on rendering objects for which it is recommended that rendering be performed at a minimum pixel width of the device.

In step S917, the CPU 112 performs a generation of a display list by the display list generation unit 210. In step S918, the CPU 112 performs rendering processing for the generated display list and generates an image by the rendering processing unit 220. At that time, the scan conversion described in FIG. 8 and FIG. 3 is performed. After the scan conversion, step S919 is advanced to. In step S919, the CPU 112 performs image processing by the image processing unit 230 for the generated image. In step S920, the CPU 112 prints, by the printer apparatus 130, the image for which image processing was performed and after that, ends the processing of FIG. 9.

In this way, the rendering method is made to be the intersect method even for a thin line in a case where the width is set to "zero". Also, the rendering method being set with the top-left method is added to the target of the widening processing in the display list generation unit 210. As the result, it is possible to avoid widening processing on a thin line for which the width is set to "zero".

Third Embodiment

In the first and the second embodiments, description is given of changing the rendering method to the top-left method if there is a thin line at a time of Postscript rendering and as the result, it is possible to avoid the problem of over-widening when the widening processing is performed. In the present embodiment, a thin line being widened too much is avoided by changing the position of the rendering object rather than changing the rendering method.

Figure 10:
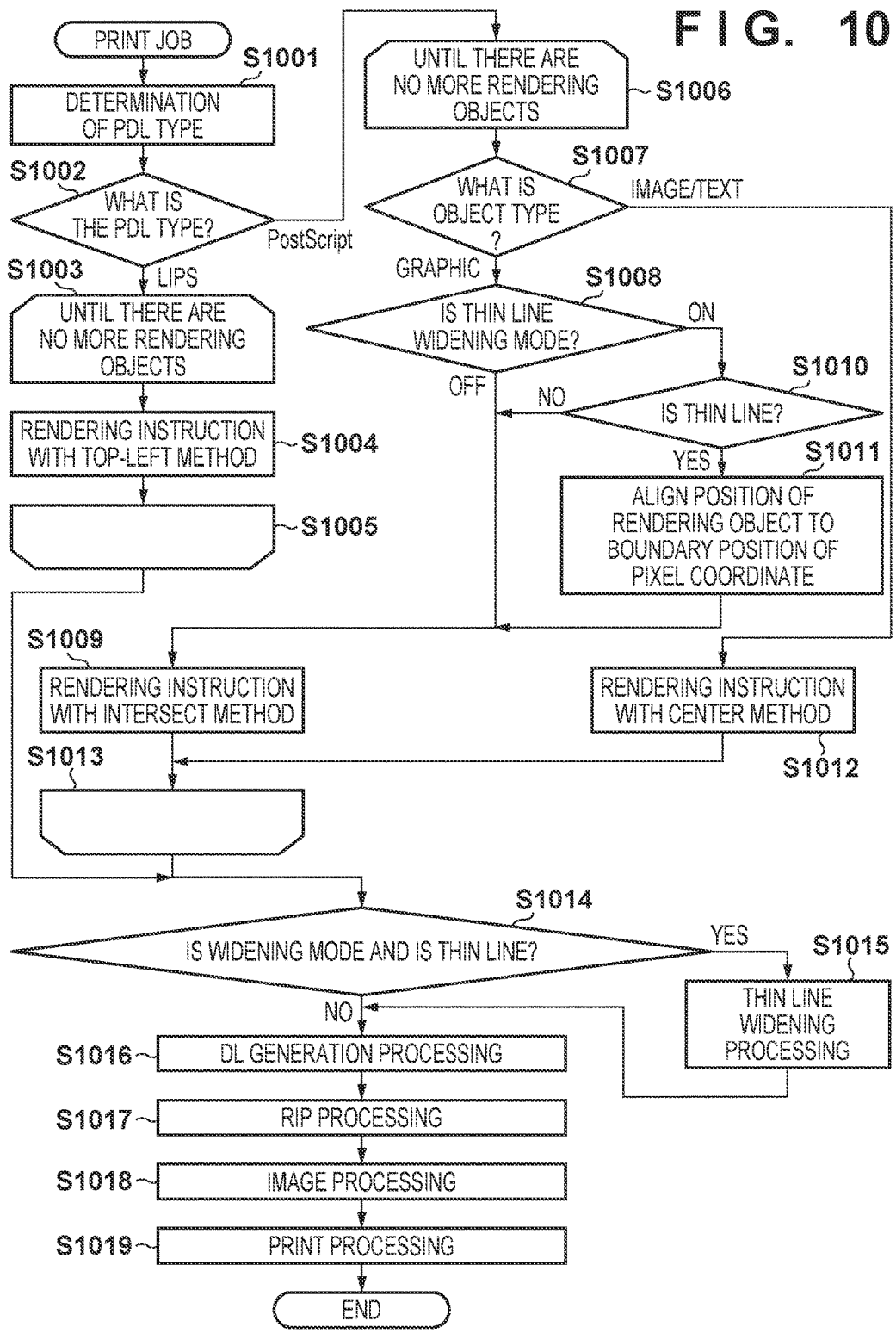
FIG. 10 is a flowchart illustrating control for executing thin line correction processing.

FIG. 10 is a flowchart illustrating control in which the image forming apparatus 100 receives a print job and executes thin line correction processing in the present embodiment.

In step S1001, the CPU 112 performs a determination of the PDL type by the job control unit 200 when a print job is received. For example, the CPU 112 determines whether the PDL type is LIPS or Postscript.

In step S1002, the CPU 112 advances to step S1003 in a case when the PDL type is determined to be LIPS and advances to step S1006 in a case when it is determined to be Postscript. The processing of step S1003 through step S1005 for a case when LIPS is determined is the same as the description of step S603 through step S605 of the first embodiment, and therefore description thereof is omitted.

Below, the processing is described in a case when the PDL type is determined to be Postscript in step S1002. Step S1006 through step S1013 are processes performed by the PDL analysis unit 202. The processing of step S1006 through step S1013 is repeatedly performed by the PDL analysis unit 202 for every rendering object within the PDL data.

In step S1006, the CPU 112 starts analysis of the PDL data by the PDL analysis unit 202. In step S1007, the CPU 112 determines whether the type of rendering object is "graphic" or "image/text". Here, step S1012 is advanced to in a case when it is determined to be "image/text", and the CPU 112 outputs a rendering command with the center method to the display list generation unit 210. Meanwhile, step S1008 is advanced to in a case when the type of the rendering object is determined to be "graphic" in step S1007. In step S1008, the CPU 112 determines whether or not the current operation mode of the image forming apparatus 100 is set as the thin line widening mode. The determination of step S1008 may be made based on content of a setting made via the operation unit 140 by the user for example.

In a case when it is determined to not be the thin line widening mode in step S1008, the CPU 112 outputs a rendering command with the intersect method to the display list generation unit 210. Meanwhile, in a case when it is determined to be the thin line widening mode in step S1008, step S1010 is advanced to.

In step S1010, the CPU 112 determines whether the rendering object is a thin line. Here, step S1009 is advanced to in a case when it is determined to not be a thin line, and the CPU 112 outputs a rendering command with the intersect method to the display list generation unit 210. Meanwhile, in a case when it is determined that the target rendering object is a thin line in step S1010, step S1011 is advanced to.

In step S1011, the CPU 112 rounds down the decimal point of the position information to an integer value in order to align the position of the rendering object with the boundary position of the pixel coordinates. In other words, correction is performed so as to cause the coordinate position of the rendering object to match with the boundary position of the pixel coordinates. After this, step S1009 is advanced to and the CPU 112 outputs a rendering command with the intersect method to the display list generation unit 210. In other words, by performing the processing of step S1011, the state becomes as described in FIG. 3B, and the thin line being widened too much can be prevented regardless of the rendering method.

The CPU 112 advances to step S1014 when the processing by the PDL analysis unit 202 ends. The processing of step S1014 through step S1019 is processing performed by the display list generation unit 210.

In step S1014, the CPU 112 determines by the display list generation unit 210 whether in the object rendering command 700 received from the PDL analysis unit 201 through 203, the widening processing mode is ON and it is a thin line object.

Step S1015 is advanced to when it is determined that it is not the case that "the widening processing mode is ON and it is a thin line object" in step S1014. On the other hand, step S1016 is advanced to when it is determined that it is not the case that "the widening processing mode is ON and it is a thin line object".

In step S1015, the CPU 112 performs widening processing for a thin line object as described using FIG. 11. Note, the result of the widening processing is that it is possible to render a fixed width by the scan conversion regardless of the rendering method because the processing of step S1011 is performed for a thin line object.

In step S1016, the CPU 112 performs a generation of a display list by the display list generation unit 210. In step S1017, the CPU 112 performs rendering processing for the generated display list and generates an image by the rendering processing unit 220. In step S1018, the CPU 112 performs image processing by the image processing unit 230 for the generated image. In step S1019, the CPU 112 prints, by the printer apparatus 130, the image for which image processing was performed and after that, ends the processing of FIG. 10.

In this way, the position is corrected so as to match the position of the thin line object to a coordinate boundary in a case when the widening processing mode is ON in the PDL interpretation processing for rendering a thin line object by top-left rendering, such as with Postscript for example. As the result, the state becomes that of the rendering object 306 of FIG. 3, and a thin line being widened too much, as illustrated in the pixel 304 of FIG. 3, can be prevented.

In addition to the operations of each foregoing embodiment, configuration may also be taken so as to determine whether the processing of step S1011 is performed after it is determined that it is a thin line in step S610 of FIG. 6 or in step S910 of FIG. 9 for example. For example, the decimal point of the position information of the rendering object is rounded down to an integer value and it is determined whether correction processing for causing the position of the rendering object to match the boundary position of the pixel coordinates is performed after it is determined that it is a thin line in step S610 of FIG. 6. Step S609 is advanced to in a case when it is determined that correction processing is performed and step S611 is advanced to in a case when it is determined that correction processing is not performed. For example, the decimal point of the position information of the rendering object is rounded down to an integer value and it is determined whether correction processing for causing the position of the rendering object to match the boundary position of the pixel coordinates is performed after it is determined that it is a thin line in step S910 of FIG. 9. Step S909 is advanced to in a case when it is determined that correction processing is performed and step S911 is advanced to in a case when it is determined that correction processing is not performed.

Also, configuration may also be taken such that a determination of whether the rendering method is switched is performed after it is determined that it is a thin line in step S610 of FIG. 6 or in step S910 of FIG. 9 for example. For example, a determination of whether the rendering method is switched is performed based on a user setting or the like after it is determined that it is a thin line in step S610 of FIG. 6, and in a case when a switch is determined, step S611 is advanced to. Meanwhile, the decimal point of the position information of the rendering object is rounded down to an integer value and correction processing for causing the position of the rendering object to match the boundary position of the pixel coordinates is performed if is determined that the rendering method is not switched, and then step S609 is advanced to. Also, a determination of whether the rendering method is switched is performed based on a user setting or the like after it is determined that it is a thin line in step S910 of FIG. 9, for example, and in a case when a switch is determined, step S911 is advanced to. Meanwhile, the decimal point of the position information of the rendering object is rounded down to an integer value and correction processing for causing the position of the rendering object to match the boundary position of the pixel coordinates is performed if is determined that the rendering method is not switched, and then step S909 is advanced to.

Also, in FIG. 10 for example, although whether the processing of step S1011 is performed is determined according to the results of the determination of step S1008 and step S1010, the following variation in which the determination of step S1010 in the flowchart of FIG. 10 is omitted may be taken. Specifically, when it is determined that the setting for widening the width of the rendering object was not made in step S1008, the CPU 112 performs the processing (intersect method instruction) of step S1009 without performing the processing of step S1011. By configuring in this way, a rendering object of the graphic attribute can be reliably rendered regardless of the rendering position even if the width is less than one pixel. Meanwhile, when it is determined that a setting in which the width of the rendering object is widened is not made in step S1008, the CPU 112 performs the processing of step S1009 after performing the processing of step S1011. In this way, even if the widening processing is performed for a rendering object of the graphic attribute, it is possible to prevent too much widening depending on the rendering position.

As described above, by virtue of each embodiment, for an object determined to be a thin line whose width is less than the threshold, a rendering method is switched or an object position is corrected and the method of rendering determined, and rendering is performed according to the determined method of rendering. As a result, it is possible to appropriately execute correction processing performed on an object which satisfies a predetermined condition and prevent excessive correction of such as over-widening a line or the like from being performed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-028299, filed Feb. 17, 2016, which is hereby incorporated by reference herein in its entirety.

What is claimed is:

1. An image forming apparatus that performs a rasterization of a thin graphic object, the image forming apparatus comprising:
   a controller including a processor and a memory storing instructions executed by the processor, wherein the controller acts as units comprising:
   (a) a correction unit configured to control, for the rasterization, whether or not to perform widening processing of widening a width of the thin graphic object, according to whether a setting of widening the thin graphic object is set to be enabled or disabled; and
   (b) a control unit configured to control, for the rasterization, whether to perform a first conversion complying with a first conversion rule on the thin graphic object for which the widening processing has been controlled to be performed by the correction unit or to perform a second conversion complying with a second conversion rule on the thin graphic object, in accordance with whether the setting of widening the thin graphic object is set to be enabled or disabled, wherein the rasterization corresponding to the first conversion rule fills or does not fill a pixel with color depending on a position of a boundary of the thin graphic object in the pixel, and wherein the rasterization corresponding to the second conversion rule fills a pixel with color in a case where the position of the boundary of the thin graphic object exists in the pixel.

2. The image forming apparatus according to claim 1, wherein the controller further acts as a rendering unit configured to perform the rasterization corresponding to the first conversion rule on the thin graphic object and the rasterization corresponding to the second conversion rule on the thin graphic object, in accordance with the control by the control unit.

3. The image forming apparatus according to claim 1, wherein the controller further acts as:
a thin graphic object detecting unit configured to detect a graphic object as the thin graphic object, by comparing a width of the graphic object with a threshold.

4. The image forming apparatus according to claim 1, wherein the control unit performs the control in accordance with page description data including the thin graphic object described by Postscript.

5. The image forming apparatus according to claim 1, wherein if the setting of widening the thin graphic object is set to be enabled, then the correction unit performs the widening processing on the thin graphic object, and the control unit causes the rasterization corresponding to the first conversion rule to be performed on the thin graphic object on which the widening processing has been performed by the correction unit, and wherein if the setting of widening the thin graphic object is set to be disabled, then the correction unit does not perform the widening processing on the thin graphic object, and the control unit causes the rasterization corresponding to the second conversion rule to be performed on the thin graphic object on which the widening processing has not been performed by the correction unit.

6. The image forming apparatus according to claim 1, wherein the correction unit performs the widening processing by changing a parameter included in a rendering command, and wherein the rasterization corresponding to the first conversion rule is performed on the thin graphic object on which the widening processing has been performed.

7. The image forming apparatus according to claim 1, wherein the controller further acts as a generation unit configured to generate data corresponding to the thin graphic object in a display list form, wherein the widening processing is performed or is not performed by the correction unit, wherein the data includes first information for designating the first conversion rule or second information for designating the second conversion rule, according to the control by the control unit, and wherein the data is rasterized based on the first conversion rule or the second conversion rule, in accordance with the first information or the second information included in the data.

8. The image forming apparatus according to claim 1, wherein the controller further acts as:

an obtaining unit configured to obtain a graphic object;
a first determination unit configured to determine whether the setting of widening the thin graphic object is enabled or disabled; and
a second determination unit configured to determine whether the obtained graphic object is the thin graphic object, if the first determination unit determines that the setting of widening the thin graphic object is enabled,
wherein the control unit controls for the rasterization to perform the first conversion, if the second determination unit determines that the obtained graphic object is the thin graphic object.

9. The image forming apparatus according to claim 8, wherein the control unit controls, for the rasterization, to perform the second conversion complying with the second conversion rule on the obtained graphic object, if the first determination unit determines that the setting of widening the thin graphic object is disabled.

10. A method executed on an image forming apparatus, the method comprising:
setting a setting of widening a thin graphic object to be enabled or disabled;
controlling, for rasterization, whether or not to perform processing of widening a width of the thin graphic object, according to whether the setting of widening the thin graphic object is set to be enabled or disabled; and
controlling, for the rasterization, whether to perform a first conversion complying with a first conversion rule on the thin graphic object for which the widening processing has been controlled to be performed and to perform a second conversion complying with a second conversion rule on the thin graphic object, in accordance with whether the setting of widening the thin graphic object is set to be enabled or disabled,
wherein, the rasterization corresponding to the first conversion rule fills or does not fill a pixel with color depending on a position of a boundary of the thin graphic object in the pixel, and
wherein the rasterization corresponding to the second conversion rule fills a pixel with color in a case where the position of the boundary of the thin graphic object exists in the pixel.

11. An image forming apparatus comprising:
a controller including a processor and a memory storing instructions executed by the processor, wherein the controller acts as units comprising:
(a) a conversion rule instruction unit configured to instruct, in a case where print data described in a predetermined type of Page Description Language (PDL) is received and a setting of widening a thin graphic object is set to be disabled, to perform a rasterization corresponding to a first conversion rule on a thin graphic object of the received print data;
(b) a control unit configured to control, for the rasterization, whether or not to perform widening processing of widening a width of the thin graphic object, in accordance with whether the setting of widening the thin graphic object is set to be enabled or disabled,
wherein, in a case where print data described in the predetermined type of PDL is received and the setting of widening the thin graphic object is set to be enabled, the conversion rule instruction unit instructs to perform a rasterization corresponding to a second conversion rule on a thin graphic object, of the received print data, of which a width is to be widened by the widening processing, instead of instructing to perform the rasterization corresponding to the first conversion rule, wherein a rasterization corresponding to the first conversion rule fills a pixel with color in a case where at least a position of a part of an area of the thin graphic object according to the received print data corresponds to a position of at least a part of an area of the pixel, and wherein a rasterization corresponding to the second conversion rule fills or does not fill a pixel with color depending on a position of a boundary of the thin graphic object in the pixel.

12. The image forming apparatus according to claim 11, wherein the predetermined type of PDL is Postscript.

13. A method executed on an image forming apparatus, the method comprising:

instructing, in a case where print data described in a predetermined type of Page Description Language (PDL) is received and a setting of widening a thin graphic object is set to be disabled, to perform a rasterization corresponding to a first conversion rule on a thin graphic object of the received print data;

instructing, in a case where print data described in the predetermined type of PDL is received and the setting of widening the thin graphic object is set to be enabled, to perform a rasterization corresponding to a second conversion rule on a thin graphic object of which a width is to be widened by the widening processing, instead of instructing to perform the rasterization corresponding to the first conversion rule; and controlling, for the rasterization, whether or not to perform widening processing of widening a width of the thin graphic object, in accordance with whether the setting of widening the thin graphic object is set to be enabled or disabled, wherein a rasterization corresponding to the first conversion rule fills a pixel with color in a case where at least a position of a part of an area of the thin graphic object according to the received print data corresponds to a position of at least a part of an area of the pixel, and wherein a rasterization corresponding to the second conversion rule fills or does not fill a pixel with color depending on a position of a boundary of the thin graphic object in the pixel.

* * * * *